(12) United States Patent
Santra et al.

(10) Patent No.: US 11,719,787 B2
(45) Date of Patent: Aug. 8, 2023

(54) RADAR-BASED TARGET SET GENERATION

(71) Applicant: Infineon Technologies AG, Neubiberg (DE)

(72) Inventors: Avik Santra, Munich (DE); Laurent Remont, Munich (DE); Michael Stephan, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 339 days.

(21) Appl. No.: 17/085,448

(22) Filed: Oct. 30, 2020

(65) Prior Publication Data
US 2022/0137181 A1    May 5, 2022

(51) Int. Cl.
G01S 7/295 (2006.01)
G01S 7/35 (2006.01)
G01S 7/41 (2006.01)
G06N 3/063 (2023.01)
G06F 18/214 (2023.01)

(52) U.S. Cl.
CPC ............ G01S 7/2955 (2013.01); G01S 7/352 (2013.01); G01S 7/417 (2013.01); G06F 18/214 (2023.01); G06N 3/063 (2013.01); G01S 7/356 (2021.05)

(58) Field of Classification Search
CPC ........ G01S 7/2955; G01S 7/352; G01S 7/417; G01S 7/356; G06K 9/6256; G06N 3/063
See application file for complete search history.

(56) References Cited

U.S. PATENT DOCUMENTS

| | | |
|---|---|---|
| 4,241,347 A | 12/1980 | Albanese et al. |
| 6,147,572 A | 11/2000 | Kaminski et al. |
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Zhu, B. et al., "Image reconstruction by domain transform manifold learning," Computer Science, Nature, Apr. 28, 2017, 18 pages.

(Continued)

*Primary Examiner* — Erin F Heard
*Assistant Examiner* — Kenneth W Good
(74) *Attorney, Agent, or Firm* — Slater Matsil, LLP

(57) ABSTRACT

In an embodiment, a method for generating a target set using a radar includes: generating, using the radar, a plurality of radar images; receiving the plurality of radar images with a convolutional encoder; and generating the target set using a plurality of fully-connected layers based on an output of the convolutional encoder, where each target of the target set has associated first and second coordinates.

27 Claims, 8 Drawing Sheets

(56) References Cited

U.S. PATENT DOCUMENTS

| | | |
|---|---|---|
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocar et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2014/0327566 A1* | 11/2014 | Burgio ............... G01S 13/343 342/108 |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Fin et al. |
| 2018/0121796 A1* | 5/2018 | Deisher ................. G10L 15/16 |
| 2019/0317191 A1 | 10/2019 | Santra et al. |
| 2020/0355817 A1* | 11/2020 | Gillian ................. G06N 3/08 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |
| WO | 2019195327 A1 | 10/2019 |

OTHER PUBLICATIONS

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

(56) References Cited

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
Sandes, Emmanuel, "Math 262/CME 372: Applied Fourier Analysis and Elements of Modern Signal Processing", Stanford Bulletin ExploreCourses, Lecture 11, Feb. 9, 2016, 8 pages.
Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.
Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.
Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Dham, Vivek "Programming Chirp Parameters in TI Radar Devices," Application Report SWRA553, Texas Instruments, May 2017, 15 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Dwiyantoro, Alvin Prayuda Juniara "Distance-IoU Loss: An Improvement of IoU-based Loss for Objection Detection Bounding Box Regression", https://medium.com/nodeflux/distance-iou-loss-an-improvement-of-iou-based-loss-for-object-detection-bounding-box-regression-4cbdd23d8660, Jan. 7, 2020, 5 pages.
Filippelli, Mario et al., "Respiratory dynamics during laughter," J Appl Physiol, (90), 1441-1446, Apr. 2001, http://iap.physiology.org/content/jap/90/4/1441.full.pdf.
Fox, Ben, "The Simple Technique That Could Save Cyclists' Lives," https://www.outsideonline.com/2115116/simple-technique-could-save-cyclists-lives, Sep. 19, 2016, 6 pages.
Gigie, Andrew et al., "Novel Approach for Vibration Detection Using Indented Radar", Progess in Electromagnetic Research C, vol. 87, pp. 147-162, Oct. 4, 2018.
Gouveia, Carolina et al., "A Review on Methods for Random Motion Detection and Compensation in Bio-Radar Systems", Sensors, MDPI, Jan. 31, 2019, 17 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Gu, Changzhan et al., "Deep Neural Network based Body Movement Cancellation for Doppler Radar Vital Sign Detection", IEEE MTT-S International Wireless Symposium (IWS) May 19-22, 2019, 3 pages.
Gu, Changzhu "Short-Range Noncontact Sensors for Healthcare and Other Emerginng Applications: A Review", Sensors, MDPI, Jul. 26, 2016, 24 pages.
Gu, Changzhan et al., "From Tumor Targeting to Speed Monitoring", IEEE Microwave Magazine, ResearchGate, Jun. 2014, 11 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.
Hungarian Algorithm, Steps of the Hungarian Algorithm—HungarianAlgorithm.com, www.hungarianalgorithm.com/hungarianalgorithm.php, printed Sep. 18, 2020, 2 pages.
Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWRIxxx Power Management Optimizations—Low Cost LC Filter Solution," Application Report SWRA577, Texas Instruments, Oct. 2017, 19 pages.
Kim, Woosuk et al., "YOLO-Based Simultaneous Target Detection and Classification in Automotive FMCW Radar Systems", Sensors, MDPI, Korea, May 20, 2020, 15 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.
Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.
Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.
Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.
Li, Changzhi "Vital-sign monitoring on the go", Sensors news and views, www.nature.com/naturelectronics, Nature Electronics, vol. 2, Jun. 2019, 2 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.
Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.
Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

(56) References Cited

OTHER PUBLICATIONS

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 42 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Rahman, Md Atiqur et al., "Optimizing Intersection-Over-Union in Deep Neural Networks for Image Segmentation", desearchGate, DOI:10.1007/978-3-319-50835-1_22, IEEE International Symposium on Visual Computing, Dec. 2016, 11 pages.

Rao, Sandeep, "MIMO Radar", Texas Instruments, Application Report, SWRA554A, May 2017, 13 pages.

Rezatofighi, Hamid et al., "Generalized Intersection over Union: A Metric and A Loss for Bounding Box Regression", ResearchGate, DOI:10/1109/CVPR.2019.00075, IEEE/CVF Conference on Computer Vision and Pattern Recognition (CVPR), Jun. 2019, 9 pages.

Richards, Mark A., "Fundamentals of Radar Signal Processing," McGraw Hill Electronic Engineering, ISBN: 0-07-144474-2, Jun. 2005, 93 pages.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Steinbaeck, Josef et al., "Design of a Low-Leval Radar and Time-of-Flight Sensor Fusion Framework", ResearchGate, Infineon Technologies Austria AG, Aug. 2018, 9 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wikipedia "Non-uniform discrete Fourier transform", https://en.wikipedia.org/wiki/Non-uniform_discrete_Fourier_transform, printed Sep. 18, 2020, 4 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Will, Christoph et al., "Advanced Template Matching Algorithm for Instantaneous Heartbeat Detection using Continuous Wave Radar Systems", ResearchGate, May 2017, 5 pages.

Will, Christoph et al., "Human Target Detection, Tracking, and Classification Using 24-GHz FMCW Radar", IEEE Sensors Journal, vol. 19, No. 17, Sep. 1, 2019, pp. 7283-7299.

Will, Christoph et al., "Local Pulse Wave Detection using Continuous Wave Radar Systems", IEEE Journal of Electromagnetics, RF and Microwaves in Medicine and Biology, Oct. 25, 2017, 9 pages.

Will, Christoph et al., "Radar-Based Heart Sound Detection", Scientific Reports, www.nature.com/scientificreports, Jul. 26, 2018, 15 pages.

Woosuk, Kim et al., "YOLO-Based Simultaneous Target Detection and Classification in Automotive FMCW Radar Systems", Sensors, MDPI, May 20, 2020, 15 pages.

Wu, Shengkai et al., "IoU-balanced Loss Functions for Single-stage Object Detection", ResearchGate, Aug. 15, 2019, 8 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

Yasrab, Robail et al., "An Encoder-Decoder Based Convolution Neural Network (CNN) for Future Advanced Driver Assistance System (ADAS)", Applied Sciences, 7, 312, doi: 10.3390/app7040312, www.mdpi/journal/applsci, Mar. 23, 2017, 21 pages.

Zheng, Zhaohui et al., "Distance-IoU Loss: Faster and Better Learning for Bounding Box Regression", Assocation for the Advancement of Artificial Intelligence, www.aaai.org, arXiv:1911.08287v1{cs.CV], Nov. 19, 2019, 8 pages.

\* cited by examiner

RADAR-BASED TARGET SET GENERATION

TECHNICAL FIELD

The present disclosure relates generally to an electronic system and method, and, in particular embodiments, to a radar-based target set generation.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method for generating a target set using a radar includes: generating, using the radar, a plurality of radar images; receiving the plurality of radar images with a convolutional encoder; and generating the target set using a plurality of fully-connected layers based on an output of the convolutional encoder, where each target of the target set has associated first and second coordinates.

In accordance with an embodiment, a method of training a neural network for generating a target set includes: providing training data to the neural network; generating a predicted target set with the neural network, where each predicted target of the predicted target set has associated first and second coordinates; assigning each predicted target to a corresponding reference target of a reference target using an ordered minimum assignment to generate an ordered reference target set, where each reference target of the reference target set includes first and second reference coordinates; using a distance-based loss function to determine an error between the predicted target set and the ordered reference target set; and updating parameters of the neural network to minimize the determined error.

In accordance with an embodiment, a radar system includes: a millimeter-wave radar sensor including: a transmitting antenna configured to transmit radar signals; first and second receiving antennas configured to receive reflected radar signals; an analog-to-digital converter (ADC) configured to generate, at an output of the ADC, raw digital data based on the reflected radar signals; and a processing system configured to process the raw digital data using a neural network to generate a target set, where each target of the target set has associated first and second coordinates, and where the neural network includes: a first fully-connected layer coupled to the output of the ADC, a transpose layer having an input coupled to an output of the fully-connected layer, and a second fully-connected layer having an input coupled to an output of the transpose layer, where the first and second fully-connected layer include non-uniform discrete Fourier transformed coefficients.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a radar-based target list generation based on deep learning and operating in the millimeter-wave regime. Embodiments of the present invention may operate in other frequency regimes.

In an embodiment of the present invention, a deep neural network is used to detect and provide the center positions of a plurality of targets based on the digital output of a millimeter-wave radar sensor. In some embodiments, a non-uniform discrete Fourier transform implemented by the deep neural network is used to generate radar images that are used by the deep neural network for the target detection.

In some embodiments, the deep neural network is trained by using supervised learning. In some embodiments, an assignment algorithm, such as Hungarian assignment or ordered minimum assignment, is used to match predictions generated by the deep neural network with labels associated with the ground-truth before applying the loss function during training. In some embodiments, the loss function used during training is a distance-based loss function.

Figure 1:
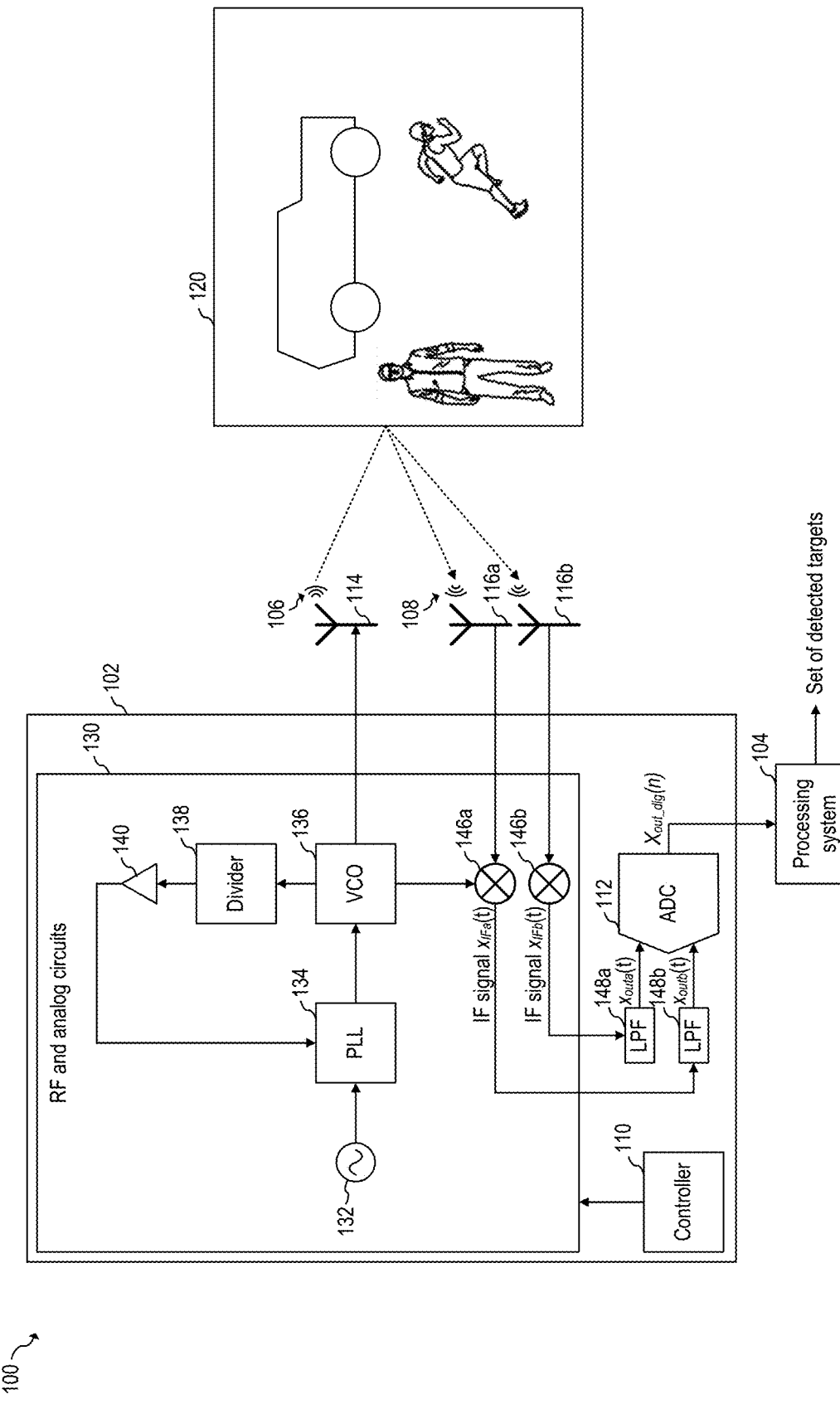
FIG. 1 shows a schematic diagram of a millimeter-wave radar system, according to an embodiment of the present invention.

A radar, such as a millimeter-wave radar, may be used to detect targets, such as humans, cars, etc. For example, FIG. 1 shows a schematic diagram of millimeter-wave radar system 100, according to an embodiment of the present invention. Millimeter-wave radar system 100 includes millimeter-wave radar sensor 102 and processing system 104.

During normal operation, millimeter-wave radar sensor 102 operates as a frequency-modulated continuous-wave (FMCW) radar sensor and transmits a plurality of TX radar signals 106, such as chirps, towards scene 120 using transmitter (TX) antenna 114. The radar signals 106 are generated using RF and analog circuits 130. The radar signals 106 may be in the 20 GHz to 122 GHz range.

The objects in scene 120 may include one or more static and moving objects, such as cars, motorcycles, bicycles, trucks, and other vehicles, idle and moving humans and animals, furniture, machinery, mechanical structures, walls and other types of structures. Other objects may also be present in scene 120.

The radar signals 106 are reflected by objects in scene 120. The reflected radar signals 108, which are also referred to as the echo signal, are received by receiver (RX) antennas 116a and 116b. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{outa}(t)$ and $x_{outb}(t)$.

The analog signal $x_{outa}(t)$ and $x_{outb}(t)$ are converted to raw digital data $x_{out\_dig}(n)$ using ADC 112. The raw digital data $x_{out\_dig}(n)$ is processed by processing system 104 to detect targets and their position. In some embodiments, processing system 104 may also be used to identify, classify, and/or track one or more targets in scene 120.

Although FIG. 1 illustrates a radar system with a two receiver antennas 116, it is understood that more than two receiver antennas 116, such as three or more, may also be used.

Although FIG. 1 illustrates a radar system with a single transmitter antenna 114, it is understood that more than one transmitter antenna 114, such as two or more, may also be used.

In some embodiments, the output of processing system 104 may be used by other systems for further processing. For example, in an embodiment in which millimeter-wave radar system 100 is implemented in a car, the output of processing system 104 may be used by a central controller of a car to support advanced driver assistance systems (ADAS), adaptive cruise control (ACC), automated driving, collision warning (CW), and/or other automotive technologies.

Controller 110 controls one or more circuits of millimeter-wave radar sensor 102, such as RF and analog circuit 130 and/or ADC 112. Controller 110 may be implemented, e.g., as a custom digital or mixed signal circuit, for example. Controller no may also be implemented in other ways, such as using a general purpose processor or controller, for example. In some embodiments, processing system 104 implements a portion or all of controller 110.

Processing system 104 may be implemented with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. Other implementations are also possible.

As a non-limiting example, RF and analog circuits 130 may be implemented, e.g., as shown in FIG. 1. During normal operation, VCO 136 generates a radar signal, such as a linear frequency chirp (e.g., from 57 GHz to 64 GHz, or from 76 GHz to 77 GHz), which is transmitted by transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140.

The TX radar signal 106 transmitted by transmitting antenna 114 is reflected by objects in scene 120 and received by receiving antennas 116a and 116b. The echo received by receiving antennas 116a and 116b are mixed with a replica of the signal transmitted by transmitting antenna 114 using mixer 146a and 146b, respectively, to produce respective intermediate frequency (IF) signals $x_{IFa}(t)$ $x_{IFb}(t)$ (also known as beat signals). In some embodiments, the beat signals $x_{IFa}(t)$ $x_{IFb}(t)$ have a bandwidth between 10 kHz and 1 MHz. Beat signals with a bandwidth lower than 10 kHz or higher than 1 MHz is also possible.

Beat signals $x_{IFa}(t)$ $x_{IFb}(t)$ are filtered with respective low-pass filters (LPFs) 148a and 148b and then sampled by ADC 112. ADC 112 is advantageously capable of sampling the filtered beat signals $x_{outa}(t)$ $x_{outb}(t)$ with a sampling frequency that is much smaller than the frequency of the signal received by receiving antennas 116a and 116b. Using FMCW radars, therefore, advantageously allows for a compact and low cost implementation of ADC 112, in some embodiments.

The raw digital data $x_{out\_dig}(n)$, which in some embodiments include the digitized version of the filtered beat signals $x_{outa}(t)$ and $x_{outb}(t)$, is (e.g., temporarily) stored, e.g., in matrices of $N_c \times N_s$ per receiver antenna 116, where $N_c$ is the number of chirps considered in a frame and $N_s$ is the number of transmit samples per chirp, for further processing by processing system 104.

In some embodiments, ADC 112 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

Figure 2:
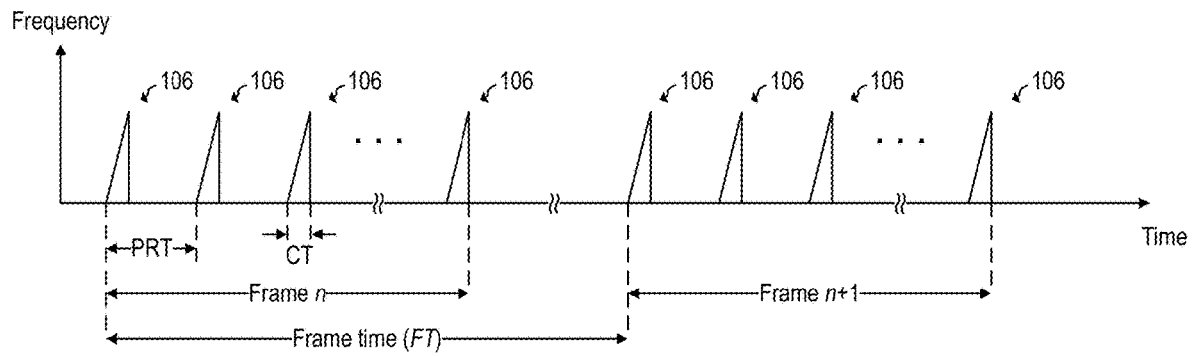
FIG. 2 shows a sequence of chirps transmitted by the transmitter antenna of FIG. 1, according to an embodiment of the present invention.

FIG. 2 shows a sequence of chirps 106 transmitted by TX antenna 114, according to an embodiment of the present invention. As shown by FIG. 2, chirps 106 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106 (also referred to, generally, as pulses). For example, in some embodiments, the number of pulses in a frame is 16. Some embodiments may include more than 16 pulses per frame, such as 20 pulses, 32 pulses, or more, or less than 16 pulses per frame, such as 10 pulses, 8 pulses, 4 or less. In some embodiments, each frame includes only a single pulse.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 µs. Higher chirp times, such as 128 µs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 102 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 3:
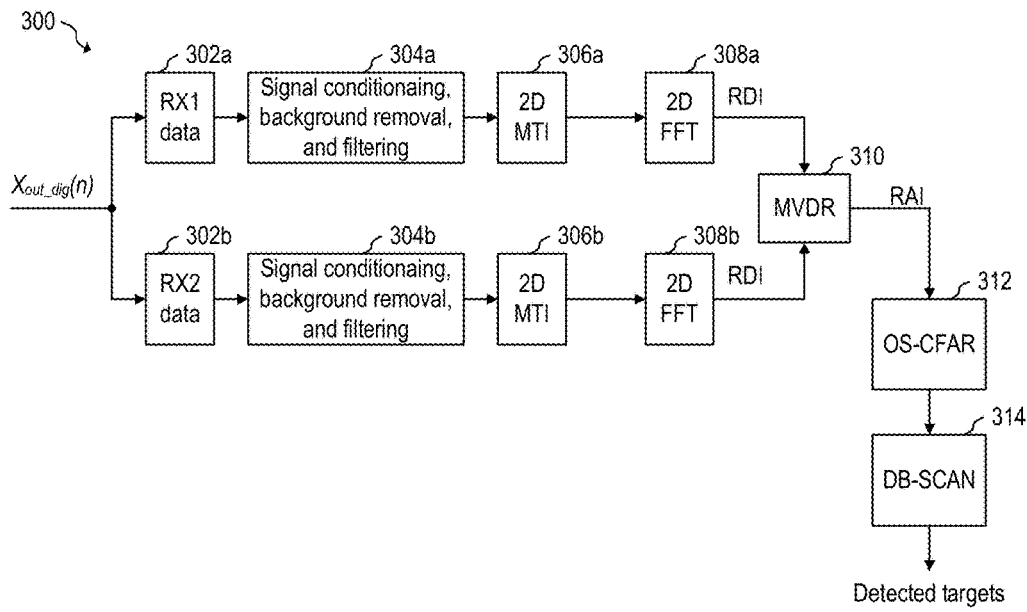
FIG. 3 shows a flow chart of an exemplary method for processing the raw digital data to perform target detection.

FIG. 3 shows a flow chart of exemplary method 300 for processing the raw digital data $x_{out\_dig}(n)$ to perform target detection.

During steps 302a and 302b, raw ADC data $x_{out\_dig}(n)$ is received. As shown, the raw ADC data $x_{out\_dig}(n)$ includes separate baseband radar data from multiple antennas (e.g., 2 in the example shown in FIG. 3). During steps 304a and 304b, signal conditioning, low pass filtering and background removal are performed on the raw ADC data of the respective antenna 116. The raw ADC data $x_{out\_dig}(n)$ radar data are filtered, DC components are removed to, e.g., remove the Tx-Rx self-interference and optionally pre-filtering the interference colored noise. Filtering may include removing data outliers that have significantly different values from other neighboring range-gate measurements. Thus, this filtering also serves to remove background noise from the radar data.

During steps 306a and 306b, 2D moving target indication (MTI) filters are respectively applied to data produced during steps 304a and 304b to remove the response from static targets. The MTI filter may be performed by subtracting the mean along the fast-time (intra-chirp time) to remove the transmitter-receiver leakage that perturbs the first few range bins, followed by subtracting the mean along the slow-time (inter-chirp time) to remove the reflections from static objects (or zero-Doppler targets).

During steps 308a and 308b, a series of FFTs are performed on the filtered radar data produced during steps 306a and 306b, respectively. A first windowed FIT having a length of the chirp is calculated along each waveform for each of a predetermined number of chirps in a frame of data. The FFTs of each waveform of chirps may be referred to as a "range FFT." A second FFT is calculated across each range bin over a number of consecutive periods to extract Doppler information. After performing each 2D FIT during steps 308a and 308b, range-Doppler images are produced, respectively.

During step 310, a minimum variance distortionless response (MVDR) technique, also known as Capon, is used to determine angle of arrival based on the range and Doppler data from the different antennas. A range-angle image (RAI) is generated during step 310.

During step 312, an ordered statistics (OS) Constant False Alarm Rate (OS-CFAR) detector is used to detect targets. The CFAR detector generates a detection image in which, e.g., "ones" represent targets and "zeros" represent non-targets based, e.g., on the power levels of the RAI, by comparing the power levels of the RAI with a threshold, points above the threshold being labeled as targets ("ones") while points below the threshold are labeled as non-targets ("zeros").

During step 314, targets present in the detection image generated during step 312 are clustered using a density-based spatial clustering of applications with noise (DB-SCAN) algorithm to associate targets from the detection image to clusters. The output of DBSCAN is a grouping of the detected points into particular targets. DBSCAN is a popular unsupervised algorithm, which uses minimum points and minimum distance criteria to cluster targets.

Figure 4:
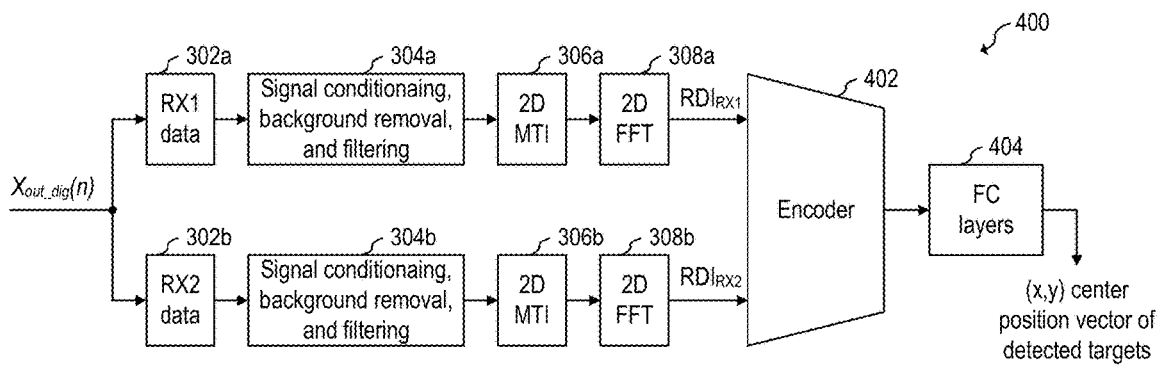
FIG. 4 shows a block diagram of an embodiment processing chain for processing radar images to perform target detection, according to an embodiment of the present invention.

FIG. 4 shows a block diagram of embodiment processing chain 400 for processing radar images (e.g., RDIs) to perform target detection, according to an embodiment of the present invention. Processing chain 400 may be implemented by processing system 104.

As shown in FIG. 4, the radar images may be generated, e.g., by performing steps 302, 304, 306 and 308. Other methods for generating the radar images may also be possible.

As shown in FIG. 4, processing chain 400 includes convolutional encoder 402 and plurality of fully-connected (dense) layers 404. Convolutional encoder 402 receives radar images associated with each of the antennas 116. In some embodiments, the convolutional encoder performs target detection based on the received radar images, as well as focuses on targets, rejects noise and ghost targets and performs feature extraction such as range information. In some embodiments, convolutional encoder 402 operates separately on the data from the different antennas, and preserves phase information (which may be used by plurality of fully-connected layers 404, e.g., for angle estimation and x,y-position estimation). In some embodiments, the output of convolutional encoder 402 is a vector of 8×2× Num_Ant×Num_Chan, where Num_Ant is the number of antennas (e.g., 2 in the embodiment illustrated in FIG. 4, 3 in the embodiment illustrated in FIG. 6), and Num_Chan is the number of channels of, e.g., the last layer of convolutional encoder 402 (before the flatten layer). In some embodiment, the multi-dimensional vector generated by convolutional encoder 402 (e.g., by a residual block layer) is then flattened before providing the output to plurality of fully-connected layers 404. In some embodiments, the residual block layer is the last layer of convolutional encoder 402.

A plurality of fully-connected layers 404 receives the output of convolutional encoder 402 and performs angle estimation, e.g., by using phase information between antennas, from, e.g., processed radar images from each antenna (e.g., separately outputted by convolutional encoder 402) and x,y-position estimation, e.g., by performing a mapping from the features extracted by convolutional converter 402 to the targets positions. Plurality of fully-connected layers 404 produces an output vector with the coordinates of each of the detected targets, e.g., via a reshape layer. For example, in an embodiment, plurality of fully-connected layers 404 include a first (e.g., 552) and second (e.g., 554) fully-connected layers, each having a rectified linear unit (ReLU) activation followed by a third (e.g., 556) fully-connected layer having a linear activation (no activation) so that the output can assume any positive or negative number. In some embodiments, the output of the third fully-connected layer is reshaped, with a reshape layer (e.g., 528), e.g., from a vector having a single column and 2*max_targets rows to a vector having max_targets rows and two columns (each column for representing the respective coordinate (e.g., x,y), where max_targets is the maximum number of detectable targets at the same time.

In the embodiment shown in FIG. 4, the output vector includes a list of (x,y) Cartesian coordinates associated with the center of each of the detected targets. For example, in an embodiment in which two detected targets are present in scene 120, the output vector $S_{targets}$ may be given by $$S_{targets} = \begin{bmatrix} x_1 & y_1 \\ x_2 & y_2 \end{bmatrix} \quad (1)$$

where $(x_1,y_1)$ are the Cartesian coordinates of the center of $target_1$, and $(x_2,y_2)$ are the Cartesian coordinates of the center of $target_1$. In some embodiments, other coordinate systems, such as Polar coordinates, may also be used.

In some embodiments, the output vector has a fixed size (e.g., 3×2, 4×2, 5×2, 7×2, 10×2, or different). In such embodiments, non-targets may be identified by a predefined value (e.g., a value outside the detection space, such as a negative value). In some embodiments, the predefined value is outside but near the detection space. For example, in some embodiments, the Euclidean distance between the location associated with the predefined value (e.g., (−1,−1)) and the point of the detection space that is closest to the location associated with the predefined value (e.g., (0,0)) is kept low (e.g., below 10% of the maximum distance between edges of the detection space), e.g., since the predefined value may be considered by the loss function, and the larger the distance between the predefined value and the detection space, the larger the weighting for the error associated with the non-targets. For example, in an embodiment in which the detection space is from (0,0) to (12,12), and the vector $S_{targets}$ has a fixed size of 5×2 (max_targets=5), the predetermined value of "−1" may be used to identify non-targets. For example, the output vector corresponding to two detected targets in scene 120 may be given by $$S_{targets} = \begin{bmatrix} -1 & -1 \\ -1 & -1 \\ x_1 & y_1 \\ -1 & -1 \\ x_2 & y_2 \end{bmatrix} \quad (2)$$

where $x_1$, $y_1$, $x_2$, $y_2$, are each between 0 and 12.

Figure 5A:
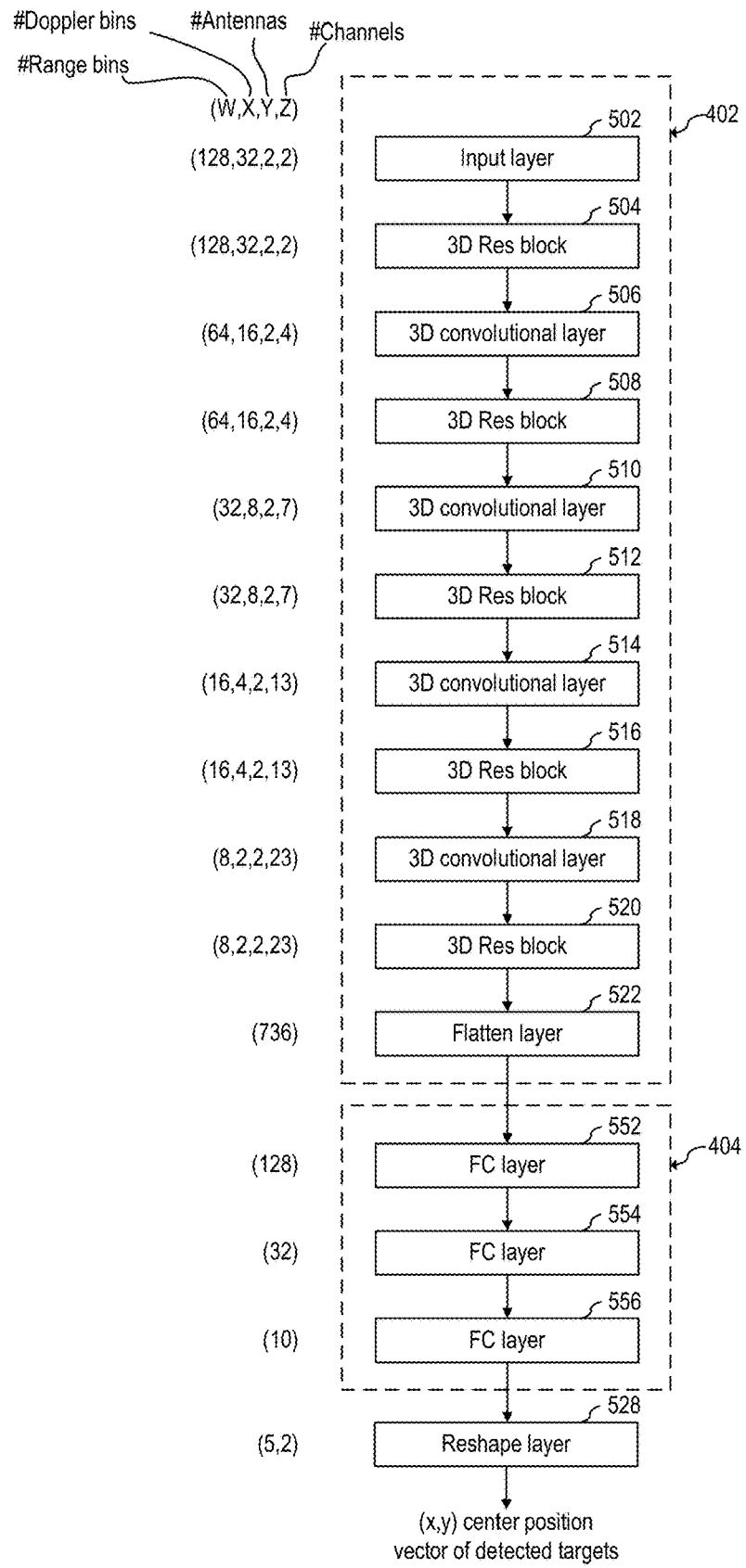
FIG. 5A shows a block diagram of a possible implementation of the convolutional encoder and plurality of fully-connected layers of FIG. 4, according to an embodiment of the present invention.
Figure 5B:
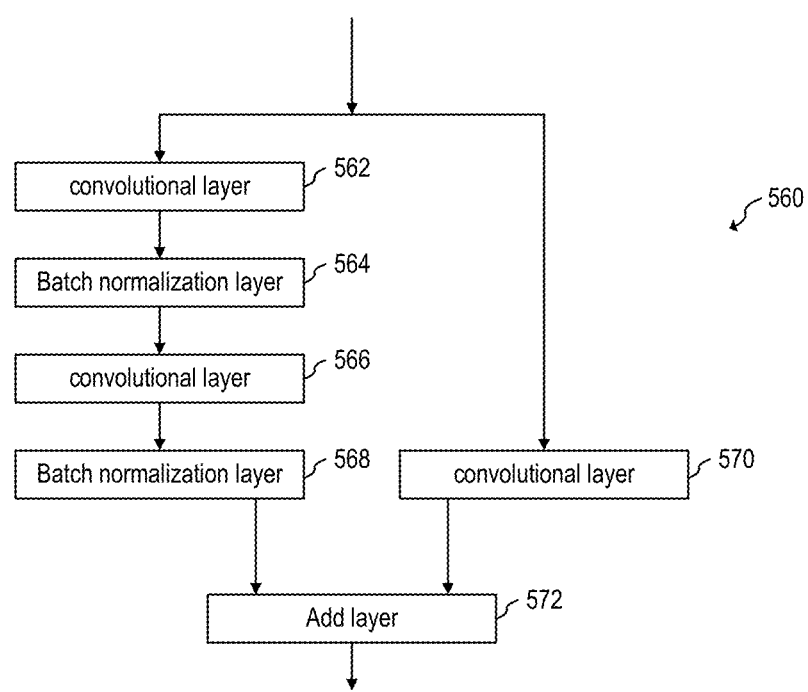
FIG. 5B shows a block diagram of a possible implementation of a residual layer of the convolutional encoder of FIG. 5A, according to an embodiment of the present invention.

In some embodiments, convolutional encoder 402 may be implemented as a deep convolutional neural network DCNN. For example, FIG. 5A shows a block diagram of a possible implementation of convolutional encoder 402, and plurality of fully-connected layers 404, according to an embodiment of the present invention. FIG. 5B shows a block diagram of residual layer 560, according to an embodiment of the present invention. Residual layer 560 is a possible implementation of residual layers 504, 508, 512, 516, and 520.

As shown in FIG. 5A, convolutional encoder 402 may be implemented with a DCNN that includes input layer 502 for receiving the radar images from respective antennas 116, three-dimensional (3D) convolutional layers 506, 510, 514, 518, 3D residual layers 504, 508, 512, 516, 520, flatten layer 522, Plurality of fully-connected layers 404 includes fully-connected layers 552, 554, and 556. Reshape layer 528 may be used to generate the output vector, e.g., with the (x,y)-coordinates.

In some embodiments, the kernel size of the 3D convolutional layers (506, 510, 514, 518) is 3×3. In some embodiments, each 3D convolutional layer (506, 510, 514, 518) has the same number of channels as the input to the corresponding 3D residual layer (508, 512, 516, 520) and uses ReLU as the activation function. In some embodiments, each 3D convolutional layer (506, 510, 514, 518) works separately on the different antennas. In some embodiments, the 3D convolutional layers coupled between residual layers have a stride of (2,2,1).

In some embodiments, 3D residual layers 504, 508, 512, 516, 520 all have the same architecture (e.g., each including the same number of layers).

In some embodiments, convolutional encoder 402 may be implemented with more layers, with fewer layers, and/or with different types of layers.

Figure 6:
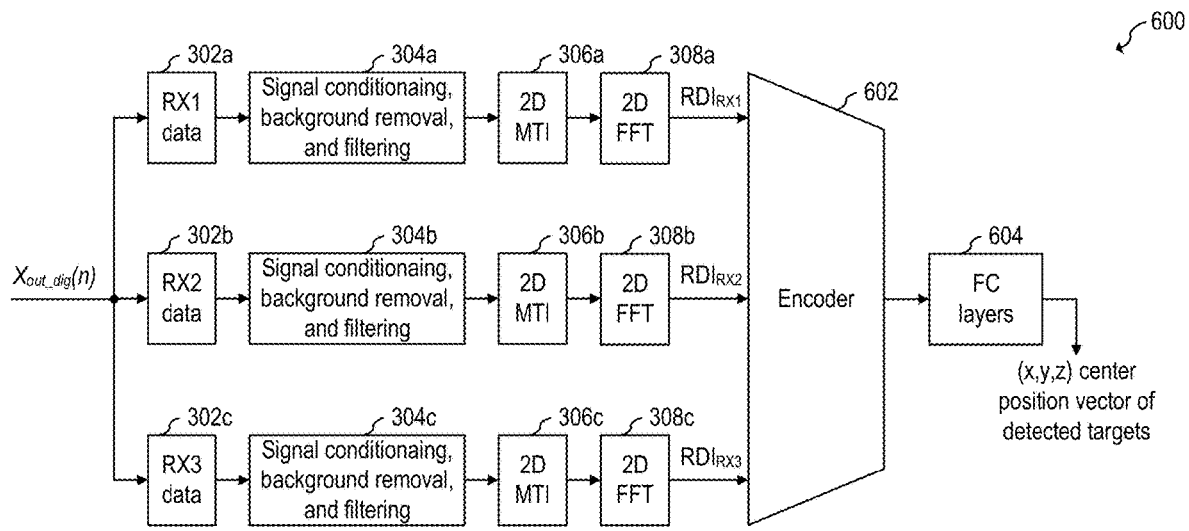
FIG. 6 shows a block diagram of an embodiment processing chain for processing radar images to perform target detection, according to an embodiment of the present invention.

In some embodiments, fully-connected layers 552 and 554, each has a ReLU activation function. Fully-connected layer 556 has a linear activation function so that the output can assume any positive or negative number. In some embodiments, the output of fully-connected layer 556 is reshaped, with reshape layer 528, e.g., from a vector having a single column and dimensions*max_targets rows to a vector having max_targets rows and dimension columns (each column for representing the respective coordinate, where max_targets is the maximum number of targets allowed to be detected at the same time. For example, in an embodiment having 2 dimensions (such as shown in FIG. 4), fully-connected layer outputs a vector having a single column and 2*max_targets rows, and reshape layer 528 maps such vector to a vector having max_targets rows and 2 columns, e.g., for (x,y)-coordinates. In an embodiment having 3 dimensions (such as shown in FIG. 6), fully-connected layer outputs a vector having a single column and 3*max_targets rows, and reshape layer 528 maps such vector to a vector having max_targets rows and 3 columns, e.g., for (x,y,z)-coordinates.

In some embodiments plurality of fully-connected layers 404 may be implemented with a different number of layers (e.g., 2, 4, 5 or more).

In some embodiments, in each convolutional layer (e.g., 506, 510, 514, 518), the input of the convolutional layer is filtered with Num_Chan filters (e.g., of size 3×3×1) to produce Num_Chan output feature maps. In some embodiments, the number of channels Num_Chan is a hyperparameter, e.g., which may be increased, e.g., in each strided convolutional layer, e.g., at a rate of, e.g., 1.8. For example, the number of channels convolutional layer 510 Num_Chan$_{510}$ may be given by Round(1.8* (Num_Chan$_{506}$)), where Num_chan$_{506}$ is the number of channels of convolutional layer 506, and Round( ) is the round function. In some embodiments, a Floor function (to round down), or a Ceiling function (to round up) may also be used. In some embodiments, the rate of increase of channels may be higher than 1.8, such as 1.85, 1.9, 2, or higher, or lower than 1.8, such as 1.65, 1.6, or lower. In some embodiments, the number of channels of each convolutional layer may be chosen individually and not subject to a particular (e.g., linear) rate of increase.

As a non-limiting example, in some embodiments:
the output of input layer 502 has 128 range bins (e.g., number of samples divided by 2), 32 Doppler bins (e.g., number of chirps in a frame), 2 antennas, and 2 channels (e.g., real and imaginary);

the output of 3D residual layer 504 has 128 range bins, 32 Doppler bins, 2 antennas, and 2 channels;

the output of convolutional layer 506 has 64 range bins, 16 Doppler bins, 2 antennas, and 4 channels (e.g., using an increment rate of 1.8), where convolutional layer 506 has 4 filters with a filter kernel size of 3×3×1, a stride of 2×2×1, and uses ReLU as activation function;

the output of 3D residual layer 508 has 64 range bins, 16 Doppler bins, 2 antennas, and 4 channels;

the output of convolutional layer 510 has 32 range bins, 8 Doppler bins, 2 antennas, and 7 channels (e.g., using an increment rate of 1.8), where convolutional layer 510 has 7 filters with a filter kernel size of 3×3×1, a stride of 2×2×1, and uses ReLU as activation function;

the output of 3D residual layer 512 has 32 range bins, 8 Doppler bins, 2 antennas, and 7 channels;

the output of convolutional layer 514 has 16 range bins, 4 Doppler bins, 2 antennas, and 13 channels (e.g., using an increment rate of 1.8), where convolutional layer 514 has 13 filters with a filter kernel size of 3×3×1, a stride of 2×2×1, and uses ReLU as activation function;

the output of 3D residual layer 516 has 16 range bins, 4 Doppler bins, 2 antennas, and 13 channels;

the output of convolutional layer 518 has 8 range bins, 2 Doppler bins, 2 antennas, and 23 channels (e.g., using an increment rate of 1.8), where convolutional layer 518 has 23 filters with a filter kernel size of 3×3×1, a stride of 2×2×1, and uses ReLU as activation function;

the output of 3D residual layer 520 has 8 range bins, 2 Doppler bins, 2 antennas, and 23 channels;

the output of flatten layer 522 has a size of 736 (8*2*2*23=736);

the output of fully-connected layer 552 has a size 128, where fully-connected layer 552 is implemented as a dense layer having 128 neurons and using ReLU as activation function;

the output of fully-connected layer 552 has a size 128, where fully-connected layer 552 is implemented as a dense layer having 128 neurons and using ReLU as activation function;

the output of fully-connected layer 554 has a size 32, where fully-connected layer 554 is implemented as a dense layer having 32 neurons and using ReLU as activation function;

the output of fully-connected layer 556 has a size 10 (when max_targets=5), where fully-connected layer 556 is implemented as a dense layer having max_targets*2 neurons and using a linear activation function;

where residual layers 504, 508, 512, 516, and 520 are implemented as residual layer 560, with convolutional layers 562, 566, each having a filter kernel size of 3×3×1, convolutional layer 570 having a filter kernel size of 1×1×1, and each of convolutional layers 562, 566, and 570 having a stride of 1×1×1, and using ReLU as activation function, and where the outputs of batch normalization layer 568 and convolutional layer 570 are added by add layer 572.

As shown by Equations 1 and 2, in some embodiments, the output vector includes two coordinates for each target. In some embodiments, the output vector includes three coordinates for each detected target. For example, FIG. 6 shows block diagram of embodiment processing chain 600 for processing radar images (e.g., RDIs) to perform target detection, according to an embodiment of the present invention. Processing chain 600 may be implemented by processing system 104.

In some embodiments, convolutional encoder 602 and plurality of fully-connected layers 604 may be implemented as convolutional encoder 402 and fully-connected layer 404, e.g., as illustrated in FIG. 5A, e.g., adapted for three dimensions.

As shown in FIG. 6, the radar images may be generated, e.g., by performing steps 302, 304, 306 and 308 over data associated with three receiver antennas 116. Other methods for generating the radar images may also be possible.

As shown in FIGS. 4 and 6, the output vector includes information about the center of the detected targets. In some embodiments, a different portion of the detected targets, such as the coordinates of the point of the detected targets closest to the radar, may be used, e.g., based on the labels used during training of the network.

Figure 7:
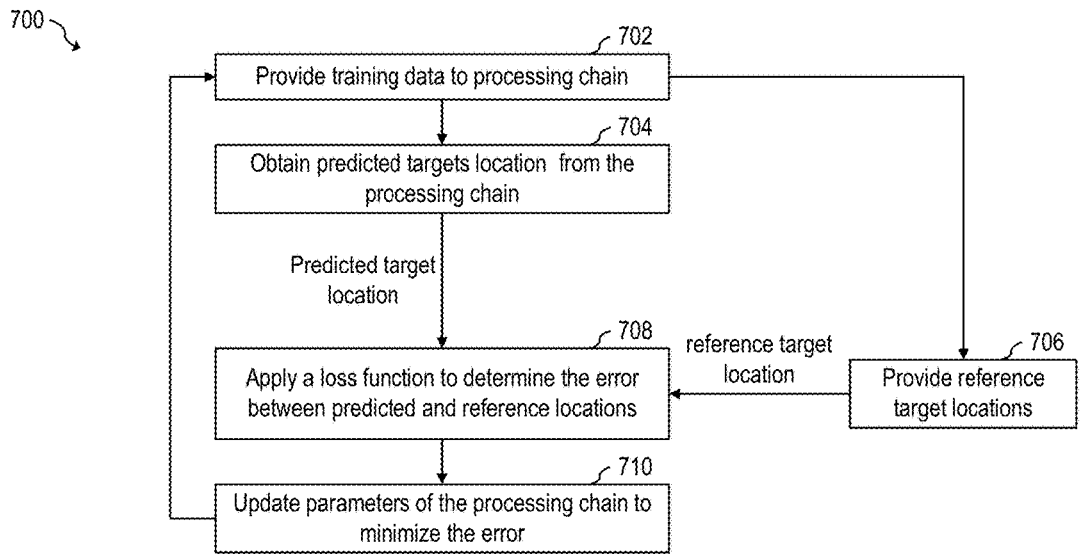
FIG. 7 shows a flow chart of an embodiment method for training the parameters of a processing chain for performing target detection, according to an embodiment of the present invention.

In some embodiments, parameters of the processing chain, such as parameters of the convolutional encoder (e.g., 402, 602, 1104, 1304) and/or the fully-connected layers (e.g., 404, 604, 1106, 1306) may be trained by using a training data set that is pre-labeled with the ground-truth. For example, in some embodiments, radar images (e.g., RDI) of the training data set are provided to the convolutional encoder. The corresponding outputs of the fully-connected layers are compared with the ground truth, and the parameters of the convolutional encoder and fully-connected layer are updated to reduce the error between the output of the fully-connected layer and the ground truth. For example, FIG. 7 shows a flow chart of embodiment method 700 for training the parameters of a processing chain for performing target detection, according to an embodiment of the present invention. Method 700 may be implemented by processing system 104.

During step 702, training data is provided to the processing chain (e.g., 400, 600, 1100, 1200, 1300). For example, in some embodiments, the training data comprises radar images (e.g., RDIs), and the processing chain comprises a convolutional encoder (e.g., 402, 602) followed by a plurality of fully-connected layers (e.g., 404, 604).

In some embodiments, the processing chain includes processing elements for performing the generation of the radar images, such as processing elements for performing steps 302, 306 and 306 (or neural network 1102). In some of such embodiments, the training data comprises raw digital data (e.g., $x_{out\_dig}(n)$) from the radar sensor (e.g., 102).

During step 704, the (e.g., center) locations of predicted targets are obtained from the output of the processing chain. For example, in some embodiments, 2D Cartesian coordinates are obtained for each predicted target. In some embodiments, 3D Cartesian coordinates are obtained for each predicted target. In some embodiments, other types of coordinates, such as Polar coordinates, are used. In some embodiments, the coordinates correspond to the center of the predicted target. In some embodiments, the coordinates correspond to a different reference point of the predicted target.

During step 706, location data (such as coordinates) associated with reference targets (also referred to as ground-truth) are provided for comparison purposes. As a non-limiting example, a portion of the training data set may be associated with two targets. The actual location of the two targets is known (e.g., the actual location, or ground-truth, may be calculated/determined using video cameras and/or using method 300 and/or using other methods). During step 706, the actual coordinates (reference coordinates) of the two targets are provided for comparison purposes.

During step 708, the error between the predicted target location (e.g., the coordinates predicted by the processing chain) and the reference target coordinates (the labeled coordinates associated with the actual target) is determined. For example, if the predicted coordinates of two detected targets are $$p = \begin{bmatrix} x_{1\_p} & y_{1\_p} \\ x_{2\_p} & y_{2\_p} \end{bmatrix}$$

and the actual (reference) coordinates of the two targets are $$\dot{y} = \begin{bmatrix} x_{1\_ref} & y_{1\_ref} \\ x_{2\_ref} & y_{2\_ref} \end{bmatrix}$$

a loss function L is applied during step 708 to determine the error between p and ẏ. In some embodiments, a single predicted target, no predicted target, two predicted targets, or more than two predicted targets may be obtained during different portions of the training data set.

In some embodiments, the loss function is a function that determines the distance (e.g., Euclidean, Mahalanobis, etc.) between the coordinates of the predicted and reference targets. For example, in some embodiments the loss function may be given by $$L = \|p - \dot{y}\| \qquad (3)$$

where $\| \, \|$ is the Euclidean distance function. For example, in some embodiments, the loss function L is equal to the sum of the individual errors between each predicted target and the corresponding reference target. When there is no predicted target, the prediction may be equal to the predetermined value, such as (−1,−1), and the loss function is calculated using such values. As such, some embodiments benefit from having a predetermined value that is outside but near the detectable space, such that the error generated by the loss function (e.g., between a predicted non-target and an actual reference target, or a predicted ghost target and a reference non-target) does not receive a disproportionate weight. For example, in some embodiments, the predetermined value may have an, e.g., Euclidean, distance to the detectable space that is lower than 10% of the maximum distance to a detectable target.

In some embodiments, there is noise associated with the ground-truth and/or with the radar measurements. In some embodiments, some error is allowed between the prediction and the ground-truth when determining the error value using the loss function. For example, in some embodiments, the loss function may be given by $$L = \max(D_{thres}, \|p - \dot{y}\|) \qquad (4)$$

where $D_{thres}$ is a distance threshold, such as 0.2 m (other values may also be used). Using a distance threshold, such as shown in Equation 4, advantageously allows avoiding further optimization when the prediction is close enough to the ground truth (since, e.g., such further optimization may not necessarily improve the model (since it may be within the noise of the system).

In some embodiments, using a distance-based loss function, such as shown in Equations 3 and 4, advantageously allows for faster convergence during training.

In some embodiments, the loss function also uses other parameters different than the distance between the predicted and reference coordinates. For example, in some embodiments, the loss function may be given by $$L = 1 - \text{IoU} + \|p - \dot{y}\| \qquad (5)$$

where IoU is an intersection-over-union function and may be given by $$IoU = \frac{|B_p \cap B_{\dot{y}}|}{|B_p \cup B_{\dot{y}}|} \qquad (6)$$

where $B_p$ and $B_{\dot{y}}$ are bounding box vectors associated with the predicted and ground-truth coordinates, respectively, where each bounding box vector includes respective bounding boxes (e.g., the coordinates of the 4 corners of each of the bounding boxes) (e.g., symmetrically) around the center locations of respective targets.

During step 710, the parameters of the processing chain, such as parameters of the convolutional encoder and of the plurality of fully-connected layers, are updated so that the error L is minimized. For example, in some embodiments, all weights and biases of convolutional layers 506, 510, 514, and 518, and of fully-connected layers 552, 554, and 556, as well as all weights and biases of convolutional layers 562, 566, and 570 for each 3D residual layer (504, 508, 512, 516, 520), are updated during step 710.

In some embodiments, steps 702, 704, 706, 708, and 710 are repeated for multiple epochs of training data of the training data set, e.g., until convergence is achieved (a local or global minima is achieved) until a minimum error is achieved, or until a predetermined number of epochs have been used for training.

In embodiments having multiple targets in the set of predicted (detected) targets from the output of the processing chain, the reference targets in the set of reference targets may not necessarily be ordered in the same way as the predicted targets of the set of predicted targets. For example, it is possible that the predicted targets and the reference targets are out of order. For example, in an embodiment, a set of predicted targets $p_1$ and a set of reference targets $y_1$ may be given by $$p_1 = \begin{bmatrix} -1 & -1 \\ 2.3 & 0.9 \\ 0.7 & 2 \\ -1 & -1 \\ 4.2 & 2.7 \end{bmatrix}; y_1 = \begin{bmatrix} 2 & 1 \\ 4 & 3 \\ 0.5 & 2 \\ -1 & -1 \\ -1 & -1 \end{bmatrix}$$

Figure 8:
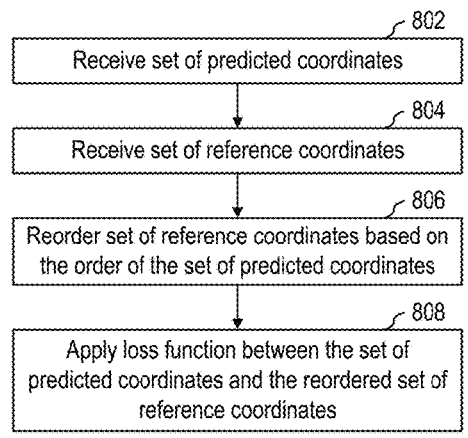
FIG. 8 shows a flow chart of an embodiment method for performing the step of error determination of the method of FIG. 7, according to an embodiment of the present invention.

Applying the loss function (e.g., any of Equations 3, 5, or 5) to the unordered sets $p_1$ and $y_1$ may provide an incorrect error value. Thus, in some embodiments, step 708 includes performing a reorder step. For example, FIG. 8 shows a flow chart of embodiment method 800 for performing step 708, according to an embodiment of the present invention.

During step 802, a set of predicted coordinates is received from the output of the processing chain. In some embodiments, the set of predicted coordinates may include non-targets, which may be labeled, e.g., with "−1." A non-limiting example of a set of predicted coordinates is $p_1$.

During step 804, a set of reference coordinates is received from the training data set. For example, in some embodiments, the training data set includes labels associated with the ground-truth location of the targets represented in the training data set. Such reference coordinates are received during step 804. In some embodiments, the set of reference coordinates may include non-targets, which may be labeled, e.g., with "−1." A non-limiting example of a set of reference coordinates is $y_1$.

During step 806, the set of reference coordinates is reordered to match the order of the set of predicted coordinates. For example, the set $y_1$ after reordering, may be given by $$p_1 = \begin{bmatrix} -1 & -1 \\ 2.3 & 0.9 \\ 0.7 & 2 \\ -1 & -1 \\ 4.2 & 2.7 \end{bmatrix}; \dot{y}_1 = \begin{bmatrix} -1 & -1 \\ 2 & 1 \\ 0.5 & 2 \\ -1 & -1 \\ 4 & 3 \end{bmatrix}$$

where $\dot{y}_1$ is the reordered set of reference coordinates. In some embodiments, the set of predicted coordinates is reordered instead of the set of reference coordinates. In some embodiments, both sets are reordered so that they match.

During step 808, the loss function (e.g., Equations 3, 4, or 5) is applied to the matching sets.

In some embodiments, the reordering step (step 806) is performed by applying the Hungarian assignment algorithm. In other embodiments, the reordering step (step 86) is performed by applying ordered minimum assignment algorithm. Other assignment algorithms may also be used.

Figure 9:
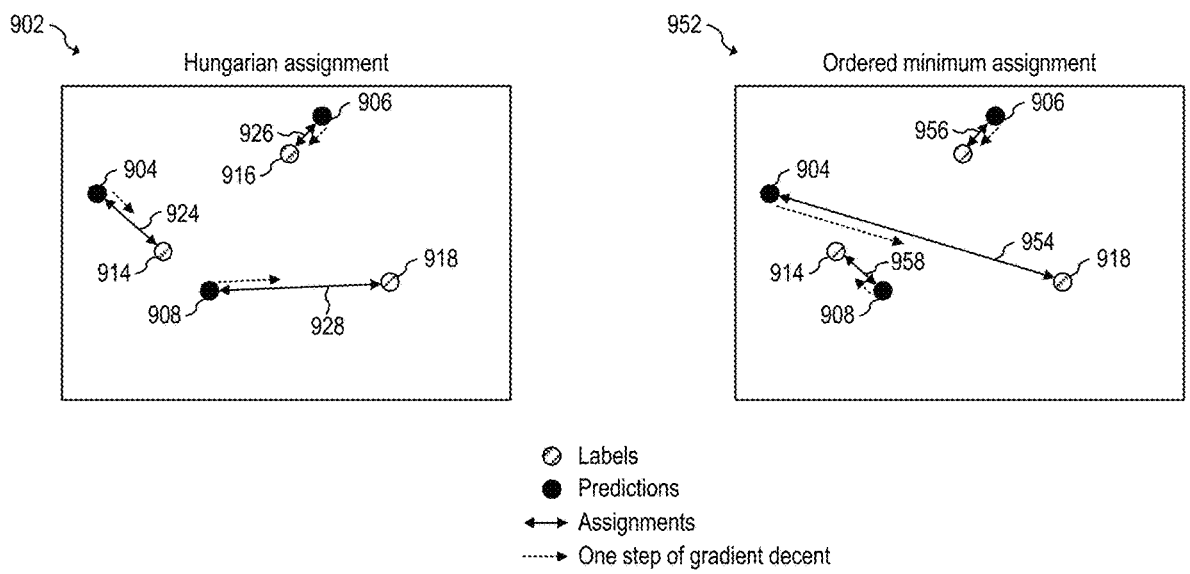
FIG. 9 shows examples of Hungarian assignment and ordered minimum assignment for matching predicted locations with ground-truth locations, according to embodiments of the present invention.

For example, the Hungarian assignment algorithm focuses on minimizing the total error (the sum of all errors between predicted and reference targets). The ordered minimum assignment focuses on matching predicted targets with their respective closest reference targets. FIG. 9 shows examples of Hungarian assignment and ordered minimum assignment for matching predicted locations with ground-truth locations, according to embodiments of the present invention. Plot 902 shows assignments between predictions 904, 906, and 908, and labels 914, 916, and 918, respectively, according to the Hungarian assignment. Plot 952 shows assignments between predictions 904, 906, and 908, and labels 914, 916, and 918, respectively, according to the ordered minimum assignment.

As shown in FIG. 9, the sum of the distances associated with assignments 924, 926, and 928 is lower than the sum of the distances associated with assignments 954, 956, and 958. As also shown in FIG. 9, using ordered minimum assignment, prediction 908 is assigned to label 914 instead of label 918, and prediction 904 is assigned to label 918 instead of label 914. Thus, in some cases, ordered minimum assignment differs from Hungarian assignment in that closest targets are matched (e.g., assignment 958) resulting in a larger error in other assignments (e.g., assignment 954). Although the total error may be larger when using ordered minimum assignment instead of Hungarian assignment, some embodiments advantageously achieve better performance using ordered minimum assignment, e.g., since it is likely that noise, or corrupted measurements, may cause a single prediction to be off, rather than all predictions being off slightly.

Figure 10:
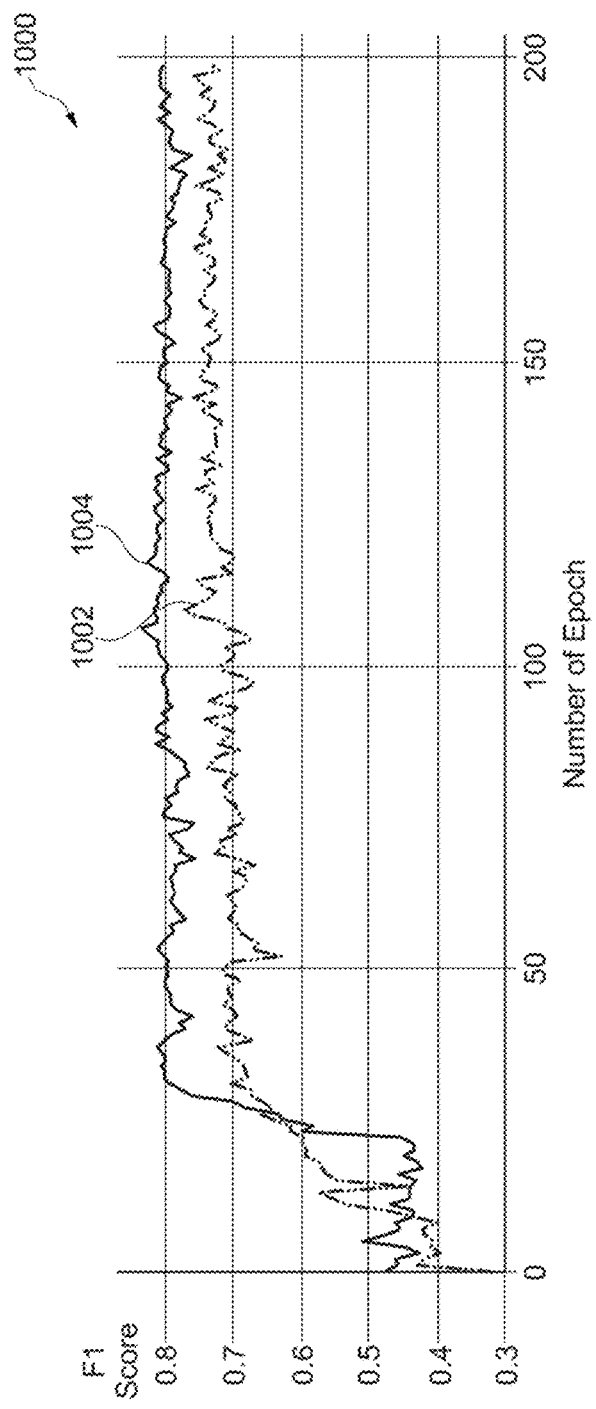
FIG. 10 shows waveforms comparing the F1 score versus number of epochs when performing the method of FIG. 7 using Hungarian assignment and ordered minimum assignment, according to embodiments of the present invention.

For example, FIG. 10 shows waveforms 1000 comparing the F1 score versus number of epochs when performing method 700 using Hungarian assignment (curve 1002) and ordered minimum assignment (curve 1004), according to embodiments of the present invention. As shown in FIG. 10, in some embodiments, using ordered minimum assignment advantageously achieves faster training convergence and/or better overall F1 score than using Hungarian assignment.

In some embodiments, applying Hungarian assignment comprises:

calculating the cost matrix C, where $c_{i,j}$ is the cost between the predicted point $p_i$ and the reference point $y_j$ according to a metric F (e.g., Euclidean distance, Mahalanobis distance, etc.), and may be given by $$c_{i,j} = F(p_i, y_j) \qquad (7)$$

finding the assignment matrix A that minimizes the element-wise product between C and A, e.g., by $$A = \arg_A \min \sum_i^N \sum_j^N c_{ij} a_{ij} \qquad (8)$$

and reordering the label vector y according to the ones in the assignment matrix A, to generate ordered vector $\hat{y}_1$.

In some embodiments, applying the ordered minimum assignment comprises:

calculating the cost matrix C (e.g., using Equation 7);

while C is not empty, finding a minimum cost entry (finding the entry with minimum cost $c_{i,j}$) and saving the indices associated with such minimum cost entry, and deleting the corresponding row and column in the cost matrix C; and after the cost matrix C is empty, reordering the points in the label vector y according to the saved indices.

For example, if max_targets is 3, then the cost matrix C is 3×3. If the saved indices are $c_{2,3}$, $c_{1,2}$, and $c_{3,1}$, the reordering changes the label order such that the third label row matches the second prediction row, the second label row matches the first prediction row, and the first label row matches the third prediction row.

In some embodiments, a non-uniform discrete Fourier transform (DFT) (NUDFT) is used to generate the radar images provided to the convolutional encoder. By using a non-uniform DFT, some embodiments advantageously are able to focus on range-Doppler features of interest while keeping memory and computational requirements low.

Figure 11:
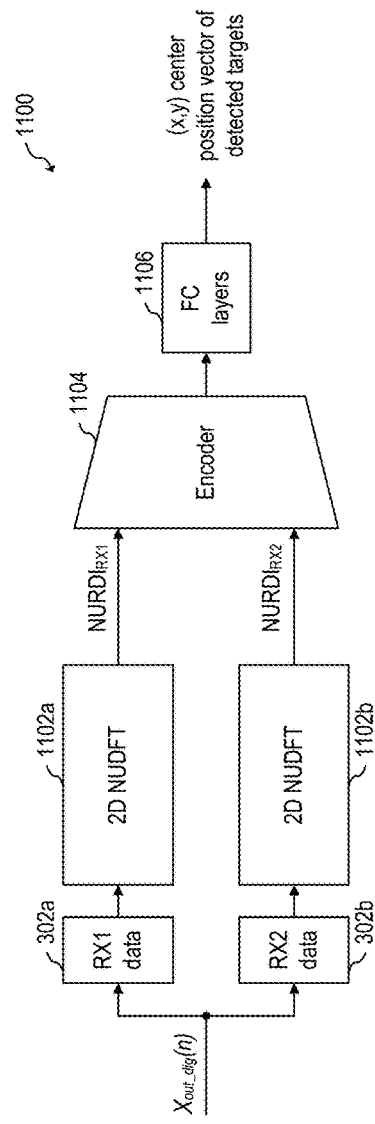
FIGS. 11-13 show block diagrams of embodiment processing chains for processing radar images to perform target detection, according to embodiments of the present invention.

FIG. 11 shows a block diagram of embodiment processing chain 1100 for processing radar images (e.g., non-uniform RDIs) to perform target detection, according to an embodiment of the present invention. Processing chain 1100 may be implemented by processing system 104. Convolutional encoder 1104 may be implemented in a similar manner as convolutional encoder 402, and Fully-connected layers 1106 may be implemented in a similar manner as fully-connected layers 406, e.g., as illustrated in FIG. 5A. Reshape layer 528 may be used to generate the output vector, e.g., with the (x,y)-coordinates.

As shown in FIG. 11, processing chain 1100 implements 2D non-uniform DFT (steps 1102a and 1102b) for generating 2D non-uniform radar images, such as non-uniform RDIs. In some embodiments, other non-uniform radar images, such as non-uniform DAI or non-uniform RAI may also be used.

The NUDFT may be understood as a type of DFT in which the signal is not sampled at equally spaced points and/or frequencies. Thus, in an embodiment generating NURDIs, during steps 1102a and 1102b, a first non-uniform range DFT is performed for each of a predetermined number of chirps in a frame of data. A second non-uniform DFT is calculated across each non-uniform range bin (the spacing between range bins is not uniform) over a number of consecutive periods to extract Doppler information. After performing each 2D NUDFT, non-uniform range-Doppler images are produced, for each antenna.

In some embodiments, the sampling points are equally spaced in time, but the DFT is not equally sampled.

Given the non-uniform sampling in range and Doppler domains, the energy distribution of the resulting NURDIs is non-uniform. Thus, some embodiments advantageously accurately focus on range-Doppler features of interest while keeping memory and computational requirements low. In some embodiments, such as in some embodiments having a plurality of antennas the memory savings become particularly advantageous, as the memory requirements may increase, e.g., linearly, as the number of antennas increases.

In some embodiments, the non-uniform sampling is learned by training a neural network. For example, in some embodiments, the NUDFT transforms a sequence of N complex numbers $x_0, x_1, \ldots, x_{N-1}$, into another sequence of complex numbers $X_0, X_1, \ldots, X_{N-1}$, e.g., given by $$X_k = \sum_{n=0}^{N-1} x_n \cdot e^{-2j\pi(\frac{n}{N})f_k}; 0 < f_k < N-1 \qquad (9)$$

where $f_k$ are non-uniform frequencies. Such non-uniform frequencies $f_k$ may be learned, e.g., by performing method 700. Thus, some embodiments advantageously allow for focusing and defocusing range bins and/or Doppler bins, which would otherwise be evenly stressed if a uniform DFT were used.

Figure 12:
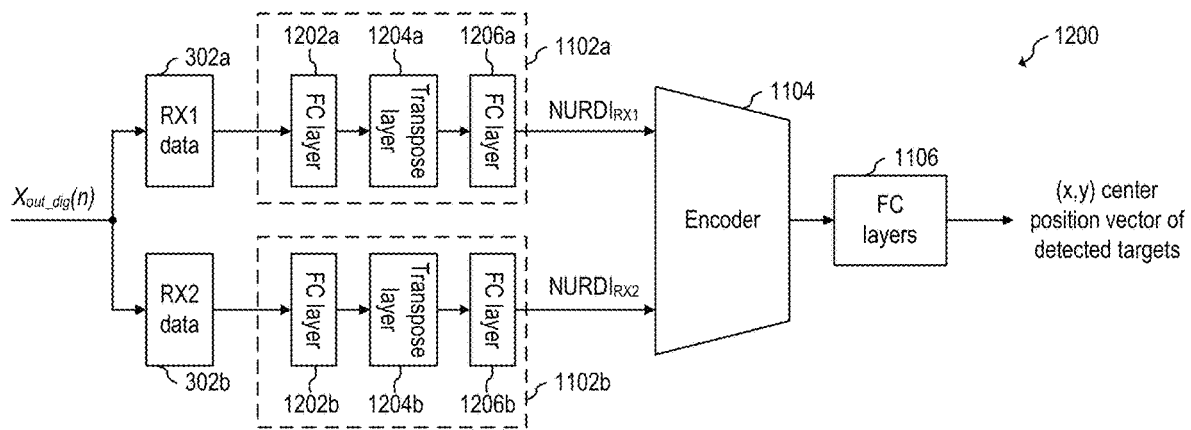

FIG. 12 shows a block diagram of embodiment processing chain 1200 for processing radar images (e.g., non-uniform RDIs) to perform target detection, according to an embodiment of the present invention. Processing chain 1200 may be implemented by processing system 104. Processing chain 1200 operates in a similar manner as processing chain 1100 and implements neural networks 1102 with fully-connected layers 1202 and 1206, and transpose layers 1204.

In some embodiments, fully-connected layers 1202a, 1202b, and 1206a and 1206b, are parametric layers that perform the computations shown in Equation 9, and having only the frequencies $f_k$ as (learnable) parameters. In some embodiments, fully-connected layer 1202a is equal to fully-connected layer 1202b and shares the same parameters; and fully-connected layer 1206a is equal to fully-connected layer 1206b and shares the same parameters. In some embodiments, fully-connected layer 1204a is equal to fully-connected layer 1204b.

As shown in FIG. 12, for each antenna 116, neural network 1102 may be implemented with fully-connected layer 1202, followed by transpose layer 1204, followed by fully-connected layer 1206. Fully-connected layer 1202 performs a range transformation by applying learned NUDFT along the ADC data for each chirp in a frame. In some embodiments, the output of fully-connected layer 1202 may be given by $$\hat{X} = W_1[x_1 x_2 x_3 \ldots x_{PN}] \qquad (10)$$

where PN is the number of chirps in a frame, and $W_1$ represents the learned NUDFT matrix.

Transpose layer 1204 transposes the output of fully-connected layer 1202, e.g., as $$\hat{X} = \hat{X}^T \qquad (11)$$

Fully-connected layer 1206 performs a Doppler transformation by applying learned NUDFT along the chirps per range bin. In some embodiments, the output of fully-connected layer 1206 may be given by $$\tilde{X} = W_2[\hat{x}_1, \hat{x}_2, \hat{x}_3 \ldots \hat{x}_{BN}] \qquad (12)$$

where BN is the number of range bins, and $W_2$ represents the learned NUDFT matrix.

In some embodiments, the NUDFT matrix $W_1$ and $W_2$ are the learnable parameters of layers 1202, 1204, and 1206 and may be learned, e.g., by performing method 700. For example, in some embodiments, the NUDFT matrix $W_1$ and $W_2$ are updated during step 710 to reduce the error generated by the loss function (e.g., based on Equations 3, 4, or 5).

In some embodiments, additional (e.g., fixed) weighting functions are applied along the ADC data (Equation 10) and the PN chirps (Equation 12), e.g., for purposes of improving sidelobe level rejection. In some embodiments, a self-attention network through fully-connected layers coupled in parallel with layers 1202, 1204, and 1206 is implemented for adapting weighting function to mimic an apodization function for achieving low sidelobe levels.

Figure 13:
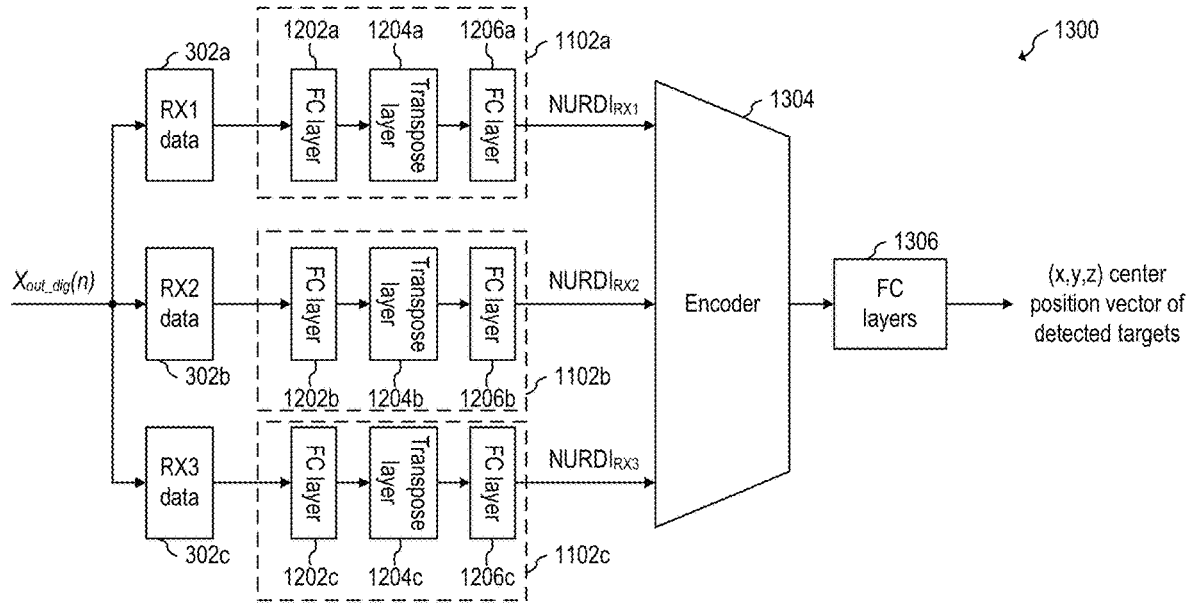

FIG. 13 shows a block diagram of embodiment processing chain 1300 for processing radar images (e.g., non-uniform RDIs) to perform target detection, according to an embodiment of the present invention. Processing chain 1300 may be implemented by processing system 104. Processing chain 1300 operates in a similar manner as processing chain 1200. Processing chain 1300, however, receives data from three receiver antennas 116 and produces an output vector that includes three coordinates for each detected target.

In some embodiments, a confidence level is associated with the output vector $S_{targets}$. For example, in some embodiments, the global signal-to-noise ratio (SNR) associated with the radar images received by the convolutional encoder (e.g., 402, 602, 1104, 1304) is used to determine the confidence level associated with the corresponding output vector $S_{targets}$. A high SNR (e.g., 20 dB or higher) is associated with high confidence while a low SNR (e.g., lower than 20 dB) is associated with low confidence. In some embodiments, low confidence output vectors are ignored (e.g., not used for further processing, such as for a subsequent Kalman filter), while high confidence output vectors are further processed.

In some embodiments, the confidence level associated with each detected target may be different. For example, in some embodiments, the output vector $S_{targets}$ includes, in addition to the coordinates for each target, a respective SNR value associated with each target. The SNR value for each detected target may be calculated based on the difference between the peak power at the target location in the radar images received by the convolutional encoder and the adjacent floor level. Thus, in some embodiments, the coordinates of a detected target may have high confidence (and further processed) while another detected target of the same output vector has low confidence (and ignored). For example, as a non-limiting example, the output vector of Equation 13 includes (x,y,SNR) values for three detected targets. The first detected target located in (1,1) has an SNR of 20 dB and thus have high confidence level. The second and third detected targets are located in (3,2) and (2,6) and have low confidence levels.

$$S_{targets} = \begin{bmatrix} 1 & 1 & 20 \\ 3 & 2 & 5 \\ 2 & 6 & 0 \end{bmatrix} \qquad (13)$$

In the embodiment illustrated by Equation 13, the global SNR is lower than 20 dB and, and some embodiments relying on global SNR may ignore all three detected targets. Embodiments relying on SNR values associated with each target may further process the first target located at (1,1) of Equation 13 while ignoring the other two targets. Thus, some embodiments advantageously generate accurate detection of at least some targets in low SNR environments.

Although the cutoff SNR value between high confidence and low confidence is 20 dB in the illustrated example, it is understood that different SNR values may also be used as the cutoff SNR value.

In some embodiments, the SNR values and location of the peak and floor levels of each detected target may be used to determine the coordinates of bounding boxes $B_p$ and $B_{\hat{y}}$ used in Equation 6.

Figure 14:
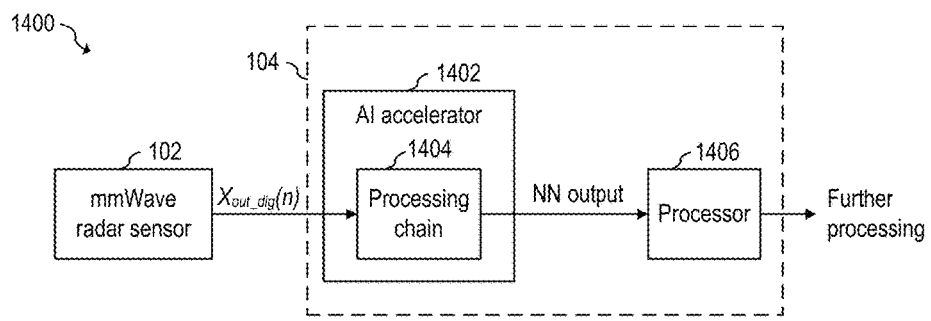
FIG. 14 shows a schematic diagram of a millimeter-wave radar system, according to an embodiment of the present invention.

FIG. 14 shows a schematic diagram of millimeter-wave radar system 1400, according to an embodiment of the present invention. Millimeter-wave radar systems operates in a similar manner as millimeter-wave radar system 100, and implements processing system 104 using artificial intelligence (AI) accelerator 1402 coupled to processor 1406.

As shown in FIG. 14, AI accelerator 1402 implements the processing chain (e.g., 1100, 1200, 1300) using neural network 1404 that directly receive raw digital data (e.g., $x_{out\_dig}(n)$) from the radar sensor (e.g., 102). Processor 1406 implements post-processing steps, such as target tracking, e.g., using a Kalman filter.

In some embodiments, AI accelerator 1402 is designed to accelerate artificial intelligence applications, such as artificial neural networks and machine learning and may be implemented in any way known in the art.

In some embodiments, processor 1406 may be implemented in any way known in the art, such as a general purpose processor, controller or digital signal processor (DSP) that includes, for example, combinatorial circuits coupled to a memory.

Advantages of some embodiments include minimizing the data flow of the radar system. For example, in radar system 1400, data flows from millimeter-wave radar 102, to AI accelerator 1402 (e.g., for target detection), then to processor 1406 (for post-processing). An approach implementing embodiment processing chain 400 would instead exhibit a data flow from millimeter-wave radar 102, to processor 1406 (for performing steps 304, 306, 308), then to AI accelerator 1402 (e.g., for target detection using 402, 404), then back to processor 1406 (for post-processing).

Example embodiments of the present invention are summarized here. Other embodiments can also be understood from the entirety of the specification and the claims filed herein.

Example 1. A method for generating a target set using a radar, the method including: generating, using the radar, a plurality of radar images; receiving the plurality of radar images with a convolutional encoder; and generating the target set using a plurality of fully-connected layers based on an output of the convolutional encoder, where each target of the target set has associated first and second coordinates.

Example 2. The method of example 1, where each target of the target set has an associated signal-to-noise (SNR) value.

Example 3. The method of one of examples 1 or 2, where the SNR value associated with a first target of the target set is different from the SNR value associated with a second target of the target set.

Example 4. The method of one of examples 1 to 3, where the first and second coordinates of each target of the target set correspond to a center position of the associated target.

Example 5. The method of one of examples 1 to 4, where each target of the target set has an associated third coordinate.

Example 6. The method of one of examples 1 to 5, where the first, second, and third coordinates correspond to the x, y, and z axes, respectively.

Example 7. The method of one of examples 1 to 6, where each radar image of the plurality of radar images is a range-Doppler image.

Example 8. The method of one of examples 1 to 7, further including generating each of the plurality of radar images using respective antennas.

Example 9. The method of one of examples 1 to 8, where generating the plurality of radar images includes using a non-uniform discrete Fourier transform.

Example 10. The method of one of examples 1 to 9, where generating the plurality of radar images includes: transmitting a plurality of radar signals using a radar sensor of the radar; receiving, using the radar, a plurality of reflected radar signals that correspond to the plurality of transmitted radar signals; mixing a replica of the plurality of transmitted radar signals with the plurality of received reflected radar signals to generate an intermediate frequency signal; generating raw digital data based on the intermediate frequency signal using an analog-to-digital converter; receiving the raw digital data using a first fully-connected layer; and generating the plurality of radar images based on an output of the first fully-connected layer.

Example 11. The method of one of examples 1 to 10, where generating the plurality of radar images further includes: receiving the output of the first fully-connected layer with a transpose layer; receiving an output of transpose layer with a second fully-connected layer; and generating the plurality of radar images using the second fully-connected layer, where an output of the second fully-connected layer is coupled to an input of the convolutional encoder.

Example 12. The method of one of examples 1 to 11, where generating the plurality of radar images further includes: applying first non-uniform discrete Fourier transform coefficients along the raw digital data for each chirp in a frame using the first fully-connected layer to generate a first matrix; transposing the first matrix using a transpose layer to generate a second matrix; and applying second non-uniform discrete Fourier transform coefficients along the chirps per range bin of the second matrix to generate the plurality of radar images.

Example 13. The method of one of examples 1 to 12, further including generating the first and second non-uniform discrete Fourier transform coefficients by: providing raw digital training data to the first fully-connected layer; generating a predicted target set with the plurality of fully-connected layers; comparing the predicted target set with a reference target set; using a loss function to determine an error between the predicted target set and the reference target set; and updating the first and second non-uniform discrete Fourier transform coefficients to minimize the determined error.

Example 14. The method of one of examples 1 to 13, where the loss function is a distance-based loss function.

Example 15. The method of one of examples 1 to 14, where the loss function is further based on an intersection-over-union function.

Example 16. The method of one of examples 1 to 15, where the loss function determines the error by determining the Euclidian distance between the first and second coordinates associated with each target and the first and second coordinates associated with each corresponding reference target of the reference target set.

Example 17. The method of one of examples 1 to 16, where comparing the predicted target set with the reference target set includes assigning each predicted target of the predicted target set to a corresponding reference target of the reference target set, and comparing each predicted target with the assigned reference target.

Example 18. The method of one of examples 1 to 17, where assigning each predicted target to the corresponding reference target is based on an ordered minimum assignment.

Example 19. The method of one of examples 1 to 18, where the convolutional encoder includes a plurality of three-dimensional convolutional layers follows by a plurality of dense layers.

Example 20. The method of one of examples 1 to 19, further including tracking a target of the target set using a Kalman filter.

Example 21. The method of one of examples 1 to 20, where the radar is a millimeter-wave radar.

Example 22. A method of training a neural network for generating a target set, the method including: providing training data to the neural network; generating a predicted target set with the neural network, where each predicted target of the predicted target set has associated first and second coordinates; assigning each predicted target to a corresponding reference target of a reference target using an ordered minimum assignment to generate an ordered reference target set, where each reference target of the reference target set includes first and second reference coordinates; using a distance-based loss function to determine an error between the predicted target set and the ordered reference target set; and updating parameters of the neural network to minimize the determined error.

Example 23. The method of example 22, where the loss function is given by $L=\max(D_{thres}, \|p-\dot{y}\|)$, where $D_{thres}$ is a distance threshold, $\|\ \|$ represents the Euclidean distance function, $p$ represents the predicted target set, and $\dot{y}$ represents the ordered reference target set.

Example 24. The method of one of examples 22 or 23, where updated the parameters of the neural network includes updating non-uniform discrete Fourier transform coefficients.

Example 25. The method of one of examples 22 to 24, where providing the training data to the neural network includes providing raw digital training data to a first fully-connected layer of the neural network, where the neural network includes a transpose layer having an input coupled to the first fully-connected layer and an output coupled to a second fully-connected layer, and where updating non-uniform discrete Fourier transform coefficients includes updating coefficients of the first and second fully-connected layers.

Example 26. A radar system including: a millimeter-wave radar sensor including: a transmitting antenna configured to transmit radar signals; first and second receiving antennas configured to receive reflected radar signals; an analog-to-digital converter (ADC) configured to generate, at an output of the ADC, raw digital data based on the reflected radar signals; and a processing system configured to process the raw digital data using a neural network to generate a target set, where each target of the target set has associated first and second coordinates, and where the neural network includes: a first fully-connected layer coupled to the output of the ADC, a transpose layer having an input coupled to an output of the fully-connected layer, and a second fully-connected layer having an input coupled to an output of the transpose layer, where the first and second fully-connected layer include non-uniform discrete Fourier transformed coefficients.

Example 27. The radar system of example 26, where the processing system includes an artificial intelligence (AI) accelerator having an input coupled to the output of the ADC and configured to process the raw digital data using the neural network to generate the target set; and a processor having an input coupled to an output of the AI accelerator and configured to receive the target set.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for generating a target set using a radar, the method comprising:
    generating, using the radar, a plurality of radar images, generating the plurality of radar images comprising
        receiving an intermediate frequency signal representative of transmitted and received radar chirps from the radar,
        applying first non-uniform discrete Fourier transform coefficients along the intermediate frequency signal for each chirp of the radar chirps in a frame to generate a first set of values, and
        applying second non-uniform discrete Fourier transform coefficients along the chirps per range bin of the first set of values to generate the plurality of radar images;
    receiving the plurality of radar images with a convolutional encoder; and
    generating the target set using a plurality of fully-connected layers based on an output of the convolutional encoder, wherein each target of the target set has associated first and second coordinates.

2. The method of claim 1, wherein each target of the target set has an associated signal-to-noise (SNR) value.

3. The method of claim 2, wherein the SNR value associated with a first target of the target set is different from the SNR value associated with a second target of the target set.

4. The method of claim 1, wherein the first and second coordinates of each target of the target set correspond to a center position of the associated target.

5. The method of claim 1, wherein each target of the target set has an associated third coordinate.

6. The method of claim 5, wherein the first, second, and third coordinates correspond to the x, y, and z axes, respectively.

7. The method of claim 1, wherein each radar image of the plurality of radar images is a range-Doppler image.

8. The method of claim 1, further comprising generating each of the plurality of radar images using respective antennas.

9. The method of claim 1, wherein generating the plurality of radar images comprises using a non-uniform discrete Fourier transform.

10. The method of claim 1, wherein
    generating the plurality of radar images further comprises:
        transmitting a plurality of radar signals using a radar sensor of the radar;
        receiving, using the radar, a plurality of reflected radar signals that correspond to the plurality of transmitted radar signals;
        mixing a replica of the plurality of transmitted radar signals with the plurality of received reflected radar signals to generate the intermediate frequency signal;
        generating raw digital data based on the intermediate frequency signal using an analog-to-digital converter;
        receiving the raw digital data using a first fully-connected layer; and
        generating the plurality of radar images based on an output of the first fully-connected layer.

11. The method of claim 10, wherein generating the plurality of radar images further comprises:
    receiving the output of the first fully-connected layer with a transpose layer;
    receiving an output of the transpose layer with a second fully-connected layer; and
    generating the plurality of radar images using the second fully-connected layer, wherein an output of the second fully-connected layer is coupled to an input of the convolutional encoder.

12. The method of claim 1, wherein the convolutional encoder comprises a plurality of three-dimensional convolutional layers follows by a plurality of dense layers.

13. The method of claim 1, further comprising tracking a target of the target set using a Kalman filter.

14. The method of claim 1, wherein the radar is a millimeter-wave radar.

15. The method of claim 1, wherein applying the first non-uniform discrete Fourier transform coefficients along the intermediate frequency signal is performed using a first fully-connected layer of a neural network.

16. The method of claim 15, wherein receiving the intermediate frequency signal comprises receiving, by the first fully-connected layer, the intermediate frequency signal as raw digital data from an analog-to-digital converter.

17. The method of claim 15, further comprising generating the first and second non-uniform discrete Fourier transform coefficients by:
    providing raw digital training data to the first fully-connected layer;
    generating a predicted target set with the plurality of fully-connected layers;
    comparing the predicted target set with a reference target set;
    using a loss function to determine an error between the predicted target set and the reference target set; and
    updating the first and second non-uniform discrete Fourier transform coefficients to minimize the determined error.

18. A method for generating a target set using a radar, the method comprising:
    generating, using the radar, a plurality of radar images, generating comprising:
        transmitting a plurality of radar signals using a radar sensor of the radar,
        receiving, using the radar, a plurality of reflected radar signals that correspond to the plurality of transmitted radar signals,
        mixing a replica of the plurality of transmitted radar signals with the plurality of received reflected radar signals to generate an intermediate frequency signal, generating raw digital data based on the intermediate frequency signal using an analog-to-digital converter, receiving the raw digital data using a first fully-connected layer, and generating the plurality of radar images based on an output of the first fully-connected layer;

receiving the plurality of radar images with a convolutional encoder; and generating the target set using a plurality of fully-connected layers based on an output of the convolutional encoder, wherein each target of the target set has associated first and second coordinates, wherein generating the plurality of radar images further comprises:

applying first non-uniform discrete Fourier transform coefficients along the raw digital data for each chirp in a frame using the first fully-connected layer to generate a first matrix, transposing the first matrix using a transpose layer to generate a second matrix, and applying second non-uniform discrete Fourier transform coefficients along the chirps per range bin of the second matrix to generate the plurality of radar images.

19. The method of claim 18, further comprising generating the first and second non-uniform discrete Fourier transform coefficients by:

providing raw digital training data to the first fully-connected layer;

generating a predicted target set with the plurality of fully-connected layers;

comparing the predicted target set with a reference target set;

using a loss function to determine an error between the predicted target set and the reference target set; and updating the first and second non-uniform discrete Fourier transform coefficients to minimize the determined error.

20. The method of claim 19, wherein the loss function is a distance-based loss function.

21. The method of claim 20, wherein the loss function is further based on an intersection-over-union function.

22. The method of claim 20, wherein the loss function determines the error by determining a Euclidian distance between the first and second coordinates associated with each target and the first and second coordinates associated with each corresponding reference target of the reference target set.

23. The method of claim 19, wherein comparing the predicted target set with the reference target set comprises assigning each predicted target of the predicted target set to a corresponding reference target of the reference target set, and comparing each predicted target with the assigned reference target.

24. The method of claim 23, wherein assigning each predicted target to the corresponding reference target is based on an ordered minimum assignment.

25. A system comprising:
a radar sensor;
a processing system coupled to the radar sensor, the processing system configured to:
generate a plurality of radar images by:
receiving an intermediate frequency signal representative of transmitted and received radar chirps from the radar sensor,
applying first non-uniform discrete Fourier transform coefficients along the intermediate frequency signal for each chirp of the radar chirps in a frame to generate a first matrix;
transposing the first matrix using a transpose layer to generate a second matrix; and
applying second non-uniform discrete Fourier transform coefficients along the chirps per range bin of the second matrix to generate the plurality of radar images;
receive the plurality of radar images with a convolutional encoder; and
generate a target set using a plurality of fully-connected layers based on an output of the convolutional encoder, wherein each target of the target set has associated first and second coordinates.

26. The system of claim 25, wherein:
the radar sensor comprises a millimeter-wave radar sensor comprising:
a transmitting antenna configured to transmit radar signals, and
first and second receiving antennas configured to receive reflected radar signals; and
the system further comprises an analog-to-digital converter (ADC) configured to generate, at an output of the ADC, the intermediate frequency signal as raw digital data based on the reflected radar signal.

27. The system of claim 26, wherein the processing system comprises a first fully-connected layer of a neural network, the first fully-connected layer configured to receive the raw digital data and apply the first non-uniform discrete Fourier transform coefficients along the intermediate frequency signal.

* * * * *